United States Patent
Berry et al.

(10) Patent No.: US 12,255,567 B2
(45) Date of Patent: Mar. 18, 2025

(54) SYSTEM AND METHOD ESTIMATING TEMPERATURE OF A DIRECT CURRENT BUS BAR AND DIRECT CURRENT CONNECTOR IN A POWER INVERTER AND PROVIDING CONTROL BASED UPON THE TEMPERATURE

(71) Applicant: GM GLOBAL TECHNOLOGY OPERATIONS LLC, Detroit, MI (US)

(72) Inventors: Daniel J. Berry, Macomb Township, MI (US); Young J. Kim, Troy, MI (US); Dylan M. Day, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 17/984,605

(22) Filed: Nov. 10, 2022

(65) Prior Publication Data
US 2024/0162835 A1    May 16, 2024

(51) Int. Cl.
*H02P 29/60*     (2016.01)
*G01K 7/00*      (2006.01)

(52) U.S. Cl.
CPC ............ *H02P 29/60* (2016.02); *G01K 7/00* (2013.01)

(58) Field of Classification Search
CPC ........ H02M 7/4835; H02M 7/43; H02M 1/00; H02M 7/537; H02P 29/68; H02P 29/60; G01K 7/00; G05B 2219/37209; H01H 2071/044
See application file for complete search history.

(56) References Cited

U.S. PATENT DOCUMENTS

| | | | | |
|---|---|---|---|---|
| 2005/0071090 A1* | 3/2005 | Katou | ................ | H02M 7/48 702/33 |
| 2014/0092655 A1* | 4/2014 | Igarashi | ............. | B60L 3/003 363/56.05 |
| 2014/0330471 A1* | 11/2014 | Ozaki | ............... | B60L 15/007 701/22 |

(Continued)

FOREIGN PATENT DOCUMENTS

CN      112003488 A  * 11/2020  ............ H02M 7/483

*Primary Examiner* — Bickey Dhakal
(74) *Attorney, Agent, or Firm* — Quinn IP Law

(57) ABSTRACT

A system includes a battery configured for providing electrical energy in direct current and a drive unit configured for utilizing electrical energy in alternating current to provide an output torque. The system includes a power inverter configured for receiving the electrical energy in direct current, transforming the electrical energy to alternating current, and providing the electrical energy in alternating current to the drive unit. The power inverter includes a direct current bus bar. The system includes a computerized controller. The controller monitors an environmental temperature of the inverter and monitors a current flow of the electrical energy received by the inverter. The controller determines an estimated temperature of the bus bar based upon the environmental temperature and the current flow and determining an inverter percent available capability based upon the estimated temperature. The controller compares the capability to a threshold value and controls the drive unit based upon the comparing.

15 Claims, 5 Drawing Sheets

(56) References Cited

U.S. PATENT DOCUMENTS

| | | | |
|---|---|---|---|
| 2015/0130380 A1* | 5/2015 | Kato | H02P 6/12 |
| | | | 318/400.21 |
| 2015/0236616 A1* | 8/2015 | Aldinger | H02M 7/537 |
| | | | 363/97 |
| 2021/0313924 A1* | 10/2021 | Yoo | H02M 1/0009 |
| 2023/0244257 A1* | 8/2023 | Anderson | B60L 3/003 |
| | | | 320/134 |

* cited by examiner

SYSTEM AND METHOD ESTIMATING TEMPERATURE OF A DIRECT CURRENT BUS BAR AND DIRECT CURRENT CONNECTOR IN A POWER INVERTER AND PROVIDING CONTROL BASED UPON THE TEMPERATURE

INTRODUCTION

The disclosure generally relates to a system and method for estimating temperature of a direct current bus bar and direct current connector in a power inverter and providing control based upon the temperature.

A battery may store electrical energy for later use by a system. A battery may provide electrical energy in direct current or at a substantially or nearly constant voltage. A system may include an electrical device that utilizes electrical energy in alternating current. Electrical energy in alternating current may have voltage in a waveform similar to a sine wave. Electrical energy in alternating current may have a single phase, with a single wave alternating above and below zero voltage. Electrical energy in alternating current may have multiple phases, with a plurality of waveforms overlapping each other.

SUMMARY

A system for estimating temperature within a power inverter and providing control based upon the temperature is provided. The system includes a battery configured for providing electrical energy in direct current and a drive unit including an electric machine configured for utilizing electrical energy in alternating current to provide an output torque to an output shaft. The system further includes the power inverter configured for receiving the electrical energy in direct current, transforming the electrical energy in direct current to the electrical energy in alternating current, and providing the electrical energy in alternating current to the drive unit. The power inverter includes a direct current bus bar. The system further includes a computerized supervisory controller. The computerized supervisory controller monitors an environmental temperature of the power inverter and monitors a current flow of the electrical energy in direct current received by the power inverter. The computerized supervisory controller further determines an estimated temperature of the direct current bus bar based upon the environmental temperature and the current flow and determining an inverter percent available capability based upon the estimated temperature. The computerized supervisory controller further compares the inverter percent available capability to a threshold value. The threshold value is selected based upon maintaining the power inverter within a desired operating temperature range. The computerized supervisory controller controls the drive unit based upon the comparing.

In some embodiments, the computerized supervisory controller controlling the drive unit includes derating the drive unit by reducing a maximum requested output torque that the drive unit is permitted to deliver.

In some embodiments, the drive unit is configured for providing data related to an oil temperature of the drive unit, and the power inverter is configured for providing data related to a coolant temperature of the power inverter. The computerized supervisory controller monitoring the environmental temperature of the power inverter includes monitoring the data related to the oil temperature of the drive unit, monitoring the data related to the coolant temperature of the power inverter, and estimating the environmental temperature based upon the data related to the oil temperature and the data related to the coolant temperature.

In some embodiments, the direct current bus bar is a first direct current bus bar, and the power inverter further includes a second direct current bus bar. The computerized supervisory controller determining the estimated temperature of the direct current bus bar includes determining an estimated temperature of the first direct current bus bar and the second direct current bus bar.

In some embodiments, the power inverter further includes a direct current connector connected to the first direct current bus bar and the second direct current bus bar. The computerized supervisory controller determines an estimated temperature of the first direct current bus bar and the second direct current bus bar at a portion of the first direct current bus bar attaching to the direct current connector and at a portion of the second direct current bus bar attaching to the direct current connector.

In some embodiments, the power inverter further includes a direct current connector connected to the direct current bus bar. The computerized supervisory controller further determines an estimated temperature of the direct current connector.

In some embodiments, the power inverter is a first power inverter, and the drive unit is a first drive unit. The system further includes a second drive unit including a second electric machine and a second power inverter. The computerized supervisory controller controlling the drive unit includes balancing load between the first power inverter and the second power inverter.

In some embodiments, the power inverter is a first power inverter, and the drive unit is a first drive unit. The system further includes a second drive unit including a second electric machine and a second power inverter. The computerized supervisory controller controlling the drive unit includes the computerized supervisory controller determining whether the inverter percent available capability below the threshold value may be compensated for by balancing load between the first power inverter and the second power inverter. When the inverter percent available capability below the threshold value may be compensated for by balancing load between the first power inverter and the second power inverter, the computerized supervisory controller controlling the drive unit further includes commanding operation of the first drive unit and the second drive unit to balance power between the first power inverter and the second power inverter. When the inverter percent available capability below the threshold value may not be compensated for by balancing load between the first power inverter and the second power inverter, the computerized supervisory controller controlling the drive unit further includes derating the first drive unit by reducing a maximum requested output torque that the first drive unit is permitted to deliver.

According to one alternative embodiment, a device including a system for estimating temperature within a power inverter and providing control based upon the temperature is provided. The device includes the system. The system includes a battery configured for providing electrical energy in direct current and a drive unit including an electric machine configured for utilizing electrical energy in alternating current to provide an output torque to an output shaft. The system further includes the power inverter configured for receiving the electrical energy in direct current, transforming the electrical energy in direct current to the electrical energy in alternating current, and providing the electrical energy in alternating current to the drive unit. The power inverter includes a direct current bus bar. The system further includes a computerized supervisory controller. The computerized supervisory controller monitors an environmental temperature of the power inverter and monitors a current flow of the electrical energy in direct current received by the power inverter. The computerized supervisory controller further determines an estimated temperature of the direct current bus bar based upon the environmental temperature and the current flow and determines an inverter percent available capability based upon the estimated temperature. The computerized supervisory controller further compares the inverter percent available capability to a threshold value. The threshold value is selected based upon maintaining the power inverter within a desired operating temperature range. The computerized supervisory controller further controls the drive unit based upon the comparing.

In some embodiments, the device is a vehicle.

In some embodiments, the computerized supervisory controller controlling the drive unit includes derating the drive unit by reducing a maximum requested output torque that the drive unit is permitted to deliver.

In some embodiments, the drive unit is configured for providing data related to an oil temperature of the drive unit. The power inverter is configured for providing data related to a coolant temperature of the power inverter. The computerized supervisory controller monitoring the environmental temperature of the power inverter includes monitoring the data related to the oil temperature of the drive unit, monitoring the data related to the coolant temperature of the power inverter, and estimating the environmental temperature based upon the data related to the oil temperature and the data related to the coolant temperature.

In some embodiments, the direct current bus bar is a first direct current bus bar, and the power inverter further includes a second direct current bus bar. The computerized supervisory controller determining the estimated temperature of the direct current bus bar includes determining an estimated temperature of the first direct current bus bar and the second direct current bus bar.

In some embodiments, the power inverter further includes a direct current connector connected to the first direct current bus bar and the second direct current bus bar. The computerized supervisory controller determines an estimated temperature of the first direct current bus bar and the second direct current bus bar at a portion of the first direct current bus bar attaching to the direct current connector and at a portion of the second direct current bus bar attaching to the direct current connector.

In some embodiments, the power inverter further includes a direct current connector connected to the direct current bus bar. The computerized supervisory controller further determines an estimated temperature of the direct current connector.

In some embodiments, the power inverter is a first power inverter, and the drive unit is a first drive unit. The device further includes a second drive unit including a second electric machine and a second power inverter. The computerized supervisory controller controlling the drive unit includes balancing load between the first power inverter and the second power inverter.

In some embodiments, the power inverter is a first power inverter and the drive unit is a first drive unit. The device further includes a second drive unit including a second electric machine and a second power inverter. The computerized supervisory controller controlling the drive unit includes the computerized supervisory controller determining whether the inverter percent available capability below the threshold value may be compensated for by balancing load between the first power inverter and the second power inverter. When the inverter percent available capability below the threshold value may be compensated for by balancing load between the first power inverter and the second power inverter, the computerized supervisory controller controlling the drive unit further includes commanding operation of the first drive unit and the second drive unit to balance power between the first power inverter and the second power inverter. When the inverter percent available capability below the threshold value may not be compensated for by balancing load between the first power inverter and the second power inverter, the computerized supervisory controller controlling the drive unit further includes derating the first drive unit by reducing a maximum requested output torque that the first drive unit is permitted to deliver.

According to one alternative embodiment, a method for estimating temperature within a power inverter and providing control based upon the temperature is provided. The method includes operating a battery configured for providing electrical energy in direct current and operating a drive unit including an electric machine configured for utilizing electrical energy in alternating current to provide an output torque to an output shaft. The method further includes operating the power inverter configured for receiving the electrical energy in direct current, transforming the electrical energy in direct current to the electrical energy in alternating current, and providing the electrical energy in alternating current to the drive unit. The power inverter includes a direct current bus bar. The method further includes, within a computerized processor, monitoring an environmental temperature of the power inverter and monitoring a current flow of the electrical energy in direct current received by the power inverter. The method further includes, within the computerized processor, determining an estimated temperature of the direct current bus bar based upon the environmental temperature and the current flow and determining an inverter percent available capability based upon the estimated temperature. The method further includes, within the computerized processor, comparing the inverter percent available capability to a threshold value, wherein the threshold value is selected based upon maintaining the power inverter within a desired operating temperature range and controlling the drive unit based upon the comparing.

In some embodiments, the power inverter is a first power inverter and the drive unit is a first drive unit. The method further includes operating a second drive unit including a second electric machine and operating a second power inverter. Controlling the drive unit includes determining whether the inverter percent available capability below the threshold value may be compensated for by balancing load between the first power inverter and the second power inverter. When the inverter percent available capability below the threshold value may be compensated for by balancing load between the first power inverter and the second power inverter, controlling the drive unit further includes commanding operation of the first drive unit and the second drive unit to balance power between the first power inverter and the second power inverter. When the inverter percent available capability below the threshold value may not be compensated for by balancing load between the first power inverter and the second power inverter, controlling the drive unit further includes derating the first drive unit by reducing a maximum requested output torque that the first drive unit is permitted to deliver.

The above features and advantages and other features and advantages of the present disclosure are readily apparent

DETAILED DESCRIPTION

Figure 1:
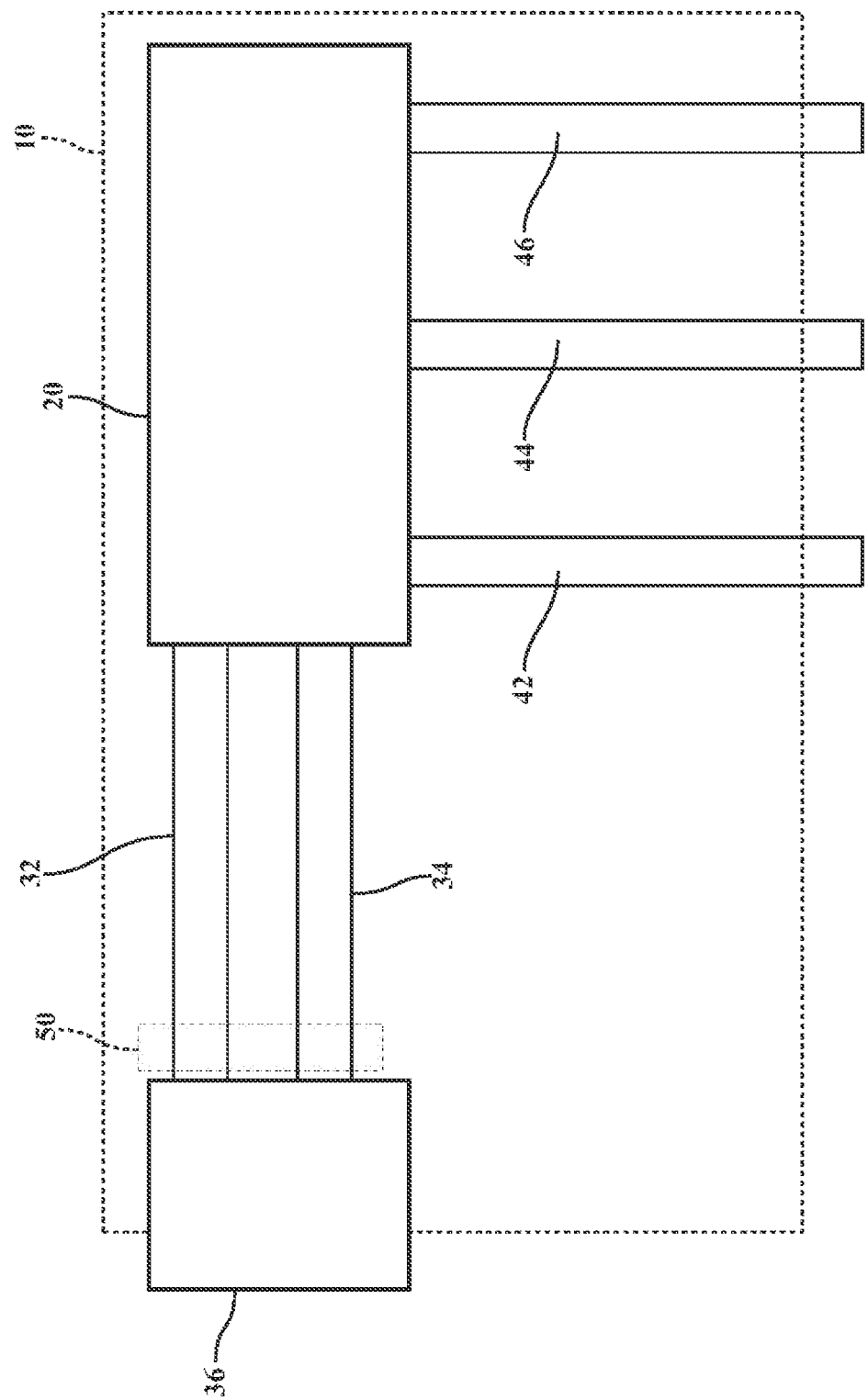
FIG. 1 schematically illustrates an exemplary power inverter including a first DC bus bar, a second DC bus bar, and a DC connector, in accordance with the present disclosure.

A power inverter may change electrical energy from direct current to/alternating current. As electrical energy is transformed between direct current and alternating current, heat is generated as the electrical energy flows through the circuits of the power inverter. A power inverter may have a desired temperature range. An over-temperature power inverter may experience reduced efficiency and a reduced lifespan.

A power inverter may include a DC link capacitor/power module. The DC link capacitor/power module may include one phase circuit or a plurality of phase circuits internal to the DC link capacitor/power module operable to transform an input electrical energy in direct current into an output electrical energy in alternating current. If an exemplary DC link capacitor/power module is configured to create an output electrical energy in alternating current with three phases, the DC link capacitor/power module may have three internal phase circuits. The power inverter may additionally include an inverter coolant system useful to regulate or control a temperature within portions of the power inverter such as the DC link capacitor/power module.

The power inverter may additionally include two DC inputs which, in one embodiment, may be described as two DC bus bars. The DC bus bars are electrically conductive material provided to conduct electrical energy from one point to a second point with low electrical resistance. The DC bus bars are each connected at a first end to the DC link capacitor/power module. The DC bus bars are each connected at a second end to an electrical connector configured to electrically connect the DC bus bars to other circuitry, for example, connecting to a battery. The power inverter may additionally include an output bus bar for each phase of the electrical energy in alternating current created by the power inverter.

Electrical energy is conducted through the DC bus bars as the power inverter operates. A magnitude of the current of the electrical energy changes based upon operation of the system of which the power inverter is a part. For example, an electric vehicle including the power inverter as part of a powertrain of the vehicle may operate through a range of states. In a first state, the vehicle may travel at a slow speed on flat pavement, with the electrical energy being utilized by the powertrain at a relatively low current. An electric machine or drive unit providing torque to propel the vehicle requires the electrical energy at the relatively low current to provide a requested output torque to provide motive force for the vehicle. In a second state, the vehicle may travel at a high speed up a hill or up sloped pavement. In this second state, the electric machine provides a significantly increased output torque as compared to the output torque requested in the first state. More output torque is required to move the vehicle at the high speed up the hill. As a result, the electric machine requires electrical energy at a relatively high current to produce the increased output torque. In a third state, the electric vehicle may utilize regenerative braking, where kinetic energy from the turning wheels of the vehicle may be transformed into an input torque or a negative output torque to the electric machine. This input torque generates electrical energy in alternating current through the electric machine, which may be transformed by the power inverter into electrical energy in direct current useful to charge the battery.

The DC bus bars of the power inverter may be configured with relatively low electrical resistance. Electrical energy being conducted through or flowing through the DC bus bars of the power inverter generate heat. Joule' Law provides a relationship of heat produced as a function of current and electrical resistance.

$$\text{Heat Generated} = I_{DC}^2 * \text{Resistance} \qquad [1]$$

wherein the electrical resistance is adjusted based on the estimated temperature of the bus bar. As heat is a function of a square of the current, increasing current flow in the circuit rapidly increases the heat produced by the circuit. Applied to the power inverter, periods of relatively high current flow may generate significant heat in the DC bus bars and/or the outlet bus bars.

The heat generated within an area or a portion of the DC bus bars is proportional to the resistance in the portion of the DC bus bars. For example, in an area in a central portion of a DC bus bar, where the portion includes an uninterrupted, relatively large cross-section of conductive material, the electrical resistance of that portion of the DC bus bar is relatively low. In another example, in a portion of a DC bus bar that includes a junction of two conductive pieces, imperfect or intermittent connection of the two conductive pieces may cause current to flow through an area with relatively small cross-section of the conductive material. An area with relatively small cross-section of the conductive material may exhibit relatively high electrical resistance. During periods of high current flow, a portion of a DC bus bar with relatively high electrical resistance will generate more heat than another portion of a bus bar with relatively low electrical resistance.

DC bus bars internal to a power inverter may be connected to a DC connector configured to enable physical connection of a bus bar or wire harness of another device or system to the power inverter. The DC connector may include connections of the DC bus bars to other conductive materials, such as connector terminals. These connections within the DC connector may cause relatively high electrical resistance in a portion of the DC connector and/or the connecting DC bus bars. The DC connector, portions of the DC bus bars proximate to the DC connector, and terminals or other hardware within the DC connector may be described as a DC connection system.

In some electric drive systems, a DC connection system cannot thermally support some vehicle maneuvers or high demand situations for which the remainder of the electric drive system (battery, motor, alternating current connections, etc. . . . ) can support. In one embodiment, no physical sensor is disposed upon the DC connector to monitor temperature. The DC connection and the DC bus bars are susceptible to reaching overtemperature conditions. The DC connection and the DC bus bars lose efficiency and may experience a shortened lifespan when exposed to these overtemperature conditions.

A system and method are provided to estimate the temperature of the DC connector and/or the DC bus bar proximate to the DC connector. In one embodiment, estimation or prediction of an overtemperature condition may be utilized to command derating, for example, limiting magnitude of requested output torque of an electric machine to limit a current flow through the DC connector and DC bus bars. In another embodiment, estimation or prediction of an overtemperature condition may be utilized to thermally balance loads between different inverters in multi-drive unit applications.

The thermal behavior of the DC connection system may be dependent on the environmental conditions or the environmental temperature to which it is exposed. No direct measurement of the local environmental temperature may be available at the DC connection system. The environment of drive unit mounted inverters may be influenced by an inverter coolant temperature and a drive unit oil temperature. The disclosed system and method may utilize a combination of measured inverter coolant temperature and measured drive unit oil temperatures to infer the environmental conditions to be used as boundary conditions to estimate or predict the DC connection system temperature.

The estimated or predicted temperature may be utilized in a computerized control scheme operated by a computerized supervisory controller. The computerized supervisory controller may include set temperature limits or desired temperature operating range of the DC bus bars. The computerized supervisory controller may command reduced output torque from an electric machine or drive unit in order to reduce a current flow directed to a power inverter that in excess of or near a set temperature limit. Wherein the vehicle or other device utilizing the disclosed system and method includes a plurality of drive units and corresponding power inverters, the computerized supervisory controller may enable increased vehicle capability as portions of the load or portions of the requested output torque to be provided for the vehicle or device may be assigned to or apportioned between the power inverters to maintain overall output. The disclosed system and method may be used to support vehicle towing applications, where long duration events of high requested output torque and corresponding high current draws are expected.

Heat generation of the DC connection system may be calculated based on the DC current through the system and the electrical resistance of the connection system. The electrical resistance may be calculated or compensated for temperature rise. A temperature of the environment may be estimated by utilizing a combination of inverter coolant and drive unit oil temperature. A computerized heat transfer model of the DC connection system may be programmed and calibrated. An estimated temperature of the DC connection system may be provided to supervisory controls for derating and load sharing.

The disclosed system and method enable the vehicle or device utilizing the system and method to avoid having to anticipate handling excessively high loads by providing a software feedback mechanism to derate power to the system if needed.

Additionally, in the case where there are multiple inverters available in the propulsion system, the disclosed system and method may be used to provide an excellent balance of thermal loads between different components and achieve better vehicle performance. The disclosed system and method provides excellent towing capability in electric vehicle trucks.

Referring now to the drawings, wherein like reference numbers refer to like features throughout the several views, FIG. 1 schematically illustrates an exemplary power inverter 10 including a first DC bus bar 32, a second DC bus bar 34, and a DC connector 36. The illustrated power inverter 10 includes two DC bus bars 32, 34. In some embodiments, the power inverter 10 may have more than two DC bus bars 32, 34. The power inverter is further illustrated including a DC link capacitor/power module 20, a first output bus bar 42, a second output bus bar 44, and a third output bus bar 46. The DC connector 36 may be electrically connected to a battery providing electrical energy in direct current. The first output bus bar 42, the second output bus bar 44, and the third output bus bar 46 each correspond to one of three phases of electrical energy in alternating current that the DC link capacitor/power module 20 provides as an output. The DC link capacitor/power module 20 is configured for transforming electrical energy in direct current to electrical energy in alternating current. The DC link capacitor/power module 20 may additionally be configured to perform the reverse transformation, transforming electrical energy in alternating current to electrical energy in direct current.

The disclosed system and method are provided to estimate a temperature of the first DC bus bar 32, the second DC bus bar 34, and/or the DC connector 36. In one embodiment, the disclosed system and method may estimate a temperature of the first DC bus bar 32 and the second DC bus bar 34 in region 50 where the first DC bus bar 32 and the second DC bus bar 34 connect to the DC connector 36.

Figure 2:
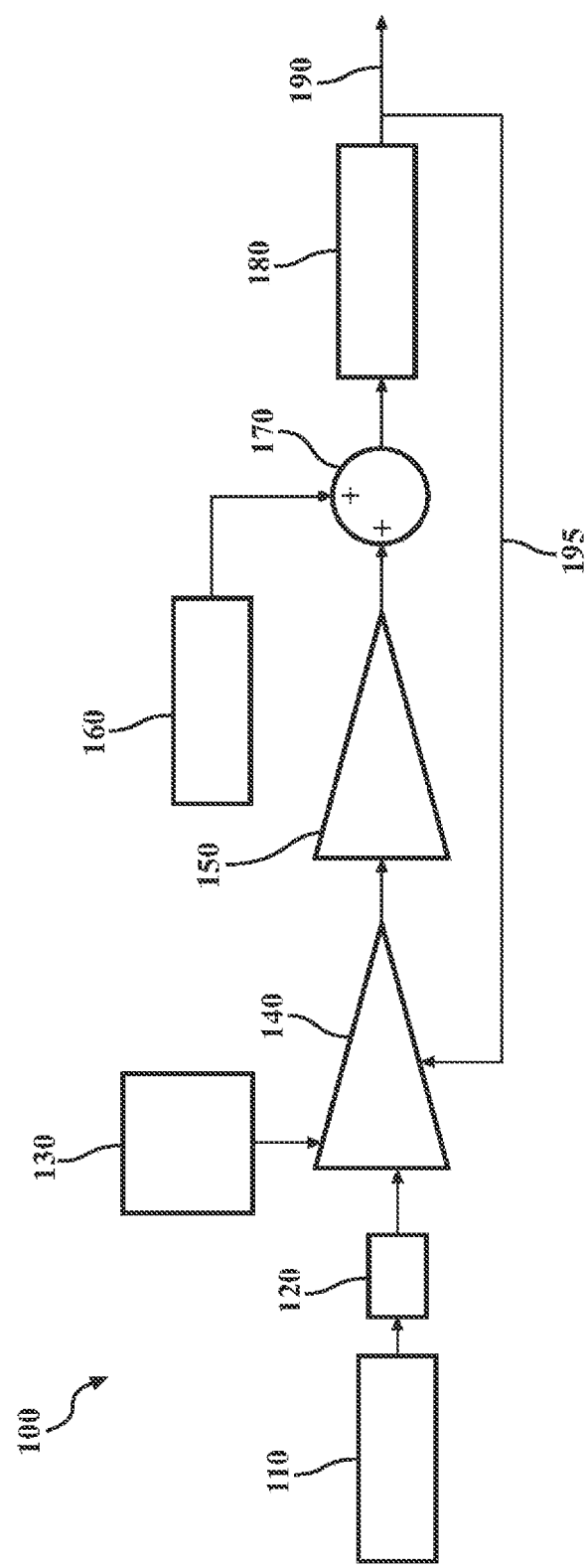
FIG. 2 schematically illustrates data flow within an exemplary DC bus bar temperature estimation module, in accordance with the present disclosure.

FIG. 2 schematically illustrates data flow within an exemplary DC bus bar temperature estimation module 100. The DC bus bar temperature estimation module 100 is illustrated providing an estimated temperature of the first DC bus bar 32 and the second DC bus bar 34 in FIG. 1 in an area of interest, such as within the region 50 of FIG. 1. In other embodiments, a plurality of DC bus bar temperature estimation modules 100 may be operated to estimate temperatures at different locations upon the first DC bus bar 32, the second DC bus bar 34, the DC connector 36. A DC current value 110 is provided. The DC current value 110 may be a calculated value, for example, based upon monitored system parameters such as a current requested output torque of an electric machine receiving power from the power inverter 10 of FIG. 1. Operation 120 squares the value provided by the DC current value 110. Operation 140 is configured to calculate a bus bar electrical resistance. The output of operation 120 is provided as an input to operation 140. Further, electrical resistance of the DC bus bar 32, 34 as a function of ambient temperature is provided as an output from lookup table 130. Further, a temperature of the DC bus bar 32, 34 is fed back as value 195 from an output of the DC bus bar temperature estimation module 100 for an improved calculation of the operation 140. The operation 140 provides the calculated bus bar electrical resistance value to an operation 150 configured to calculate thermal resistance of the DC bus bar 32, 34 and provide an output describing an effect of DC current flow upon temperature of the DC bus bar 32, 34. Operation 160 determines an effect of an environmental temperature upon temperature of the DC bus bar 32, 34, which may be determined based upon a power inverter coolant flow temperature and/or a drive unit oil temperature, which may be provided by sensors located upon or within the power inverter 10 and an electric machine/drive unit, respectively. An exemplary determination of the operation 160 is provided by Equation 2.

$$T_{Environment} = K_{ratio} * \text{Inverter Coolant Temp} + (1 - K_{ratio}) * \text{Drive Unit Oil Temp} \quad [2]$$

Operation 170 is a summation module, adding the outputs of operations 150 and 160 to generate an output describing an effect of both DC current flow and environmental temperature upon the temperature of the DC bus bar 32, 34. Operation 180 includes a computerized DC bus bar thermal capacitance model which may be configured to take into account an initial temperature of the DC bus bar 32, 34, a thermal capacitance term related to geometry and materials of the DC bus bar 32, 34, and a calibratable offset term which may be set based upon observed performance and factors. The operation 180 provides an output 190 estimating a temperature of the DC bus bar 32, 34. The estimated temperature described by output 190 may be fed back to operation 140 as the value 195 to improve future iterations of the estimation. The DC bus bar temperature estimation module 100 is provided as an exemplary data flow to estimate a temperature of the DC bus bar 32, 34. The DC bus bar temperature estimation module 100 may be iteratively run for different portions of the DC bus bars 32, 34. The DC bus bar temperature estimation module 100 may be altered or provided with alternative sets of parameters to alternatively or additionally estimate temperature of the DC connector 36. Additional or alternative operations are envisioned, and the disclosure is not intended to be limited to the examples provided herein.

Figure 3:
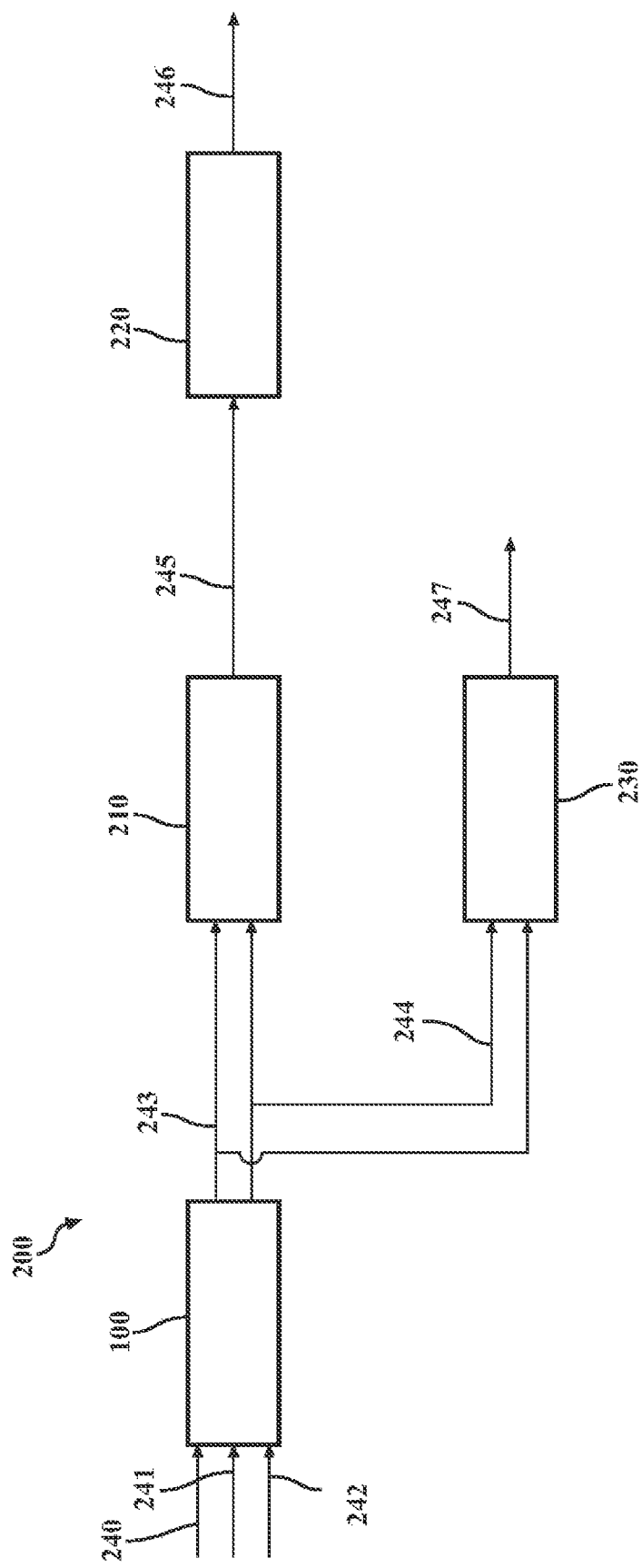
FIG. 3 schematically illustrates an exemplary dataflow for a computerized supervisory controller, in accordance with the present disclosure.

FIG. 3 schematically illustrates an exemplary dataflow for a computerized supervisory controller 200. The computerized supervisory controller 200 may include a processor, random-access memory (RAM), and memory storage. The computerized supervisory controller 200 may include a system on a chip (SoC). The computerized supervisory controller 200 may be configured to execute programming to establish an operating system. The computerized supervisory controller 200 may be configured to executed programming to monitor data, make determinations based upon the monitored data, and generated control commands useful to control operation of the power inverter 10, related components such as a drive unit, and other related factors and systems.

The illustrated dataflow of the computerized supervisory controller 200 includes the DC bus bar temperature estimator 100 of FIG. 2. The DC bus bar temperature estimator 100 is illustrated receiving signal 240 describing inverter coolant temperature as a first input, signal 241 describing drive unit oil temperature as a second input, and signal 242 describing inverter DC current as a third input. The DC bus bar temperature estimator 100 is illustrated providing signal 243 describing an estimator status and signal 244 describing a bus bar temperature as outputs. The signal 244 may include the estimated temperature described by output 190 of FIG. 2. The signal 243 and the signal 244 are provided to determination module 210, which includes programming configured to determine an inverter percent available capability based upon the estimated temperature described by output 190. The determination module 210 provides an output 245 describing a percent available capability of the power inverter 10 of FIG. 1. The output 245 is provided to a motor torque local derating module 220, which evaluates the percent available capability of the power inverter 10 and commands torque derate of an electric machine/drive unit related to the power inverter 10 if the percent available capability of the power inverter 10 is below a threshold value. The threshold value may be selected based upon test or calibration data configured for preventing a temperature of the DC bus bar 32, 34 of FIG. 1 from exceeding a desired operating temperature range. In this way, the computerized supervisory controller 200 may control an output torque of an electric machine/drive unit based upon controlling temperature of the DC bus bar 32, 34.

The computerized supervisory controller 200 may further include a multi-drive unit control module 230. The signals 243 and 244 including the estimated DC bus bar temperatures for each of a plurality of power inverters 10 are provided to the multi-drive unit control module 230. The multi-drive unit control module 230 includes programming to balance requested output torque from a plurality of drive units, thereby balancing DC current directed to each of the corresponding power inverters 10, in order to manage temperature of the DC bus bars 32, 34 in each of the power inverters 10. The dataflow of the computerized supervisory controller 200 is provided as an example of how operation of one or more drive units and the corresponding power inverters 10 may be accomplished based upon an estimated DC bus bar temperature. Additional or alternative determinations are envisioned, and the disclosure is not intended to be limited to the examples provided herein.

The computerized supervisory controller 200 is illustrated operating a temperature estimation for the DC bus bars 32, 34. The computerized supervisory controller 200 may additionally or alternatively perform similar determinations to operate a temperature estimation for the DC connector 36. The computerized supervisory controller 200 may further additionally or alternatively utilize the temperature estimation for the DC connector 36 to derate one or more drive units and balance requested output torque from the plurality of drive units. In one embodiment, the computerized supervisory controller 200 may determine iteratively estimated temperatures at a plurality of locations which may be on the first DC bus bar 32, on the second DC bus bar 34, and the DC connector 36, and the supervisory controller 200 may select a highest temperature among the estimated temperatures to utilize in controlling the drive unit(s) and power inverter(s).

Figure 4:
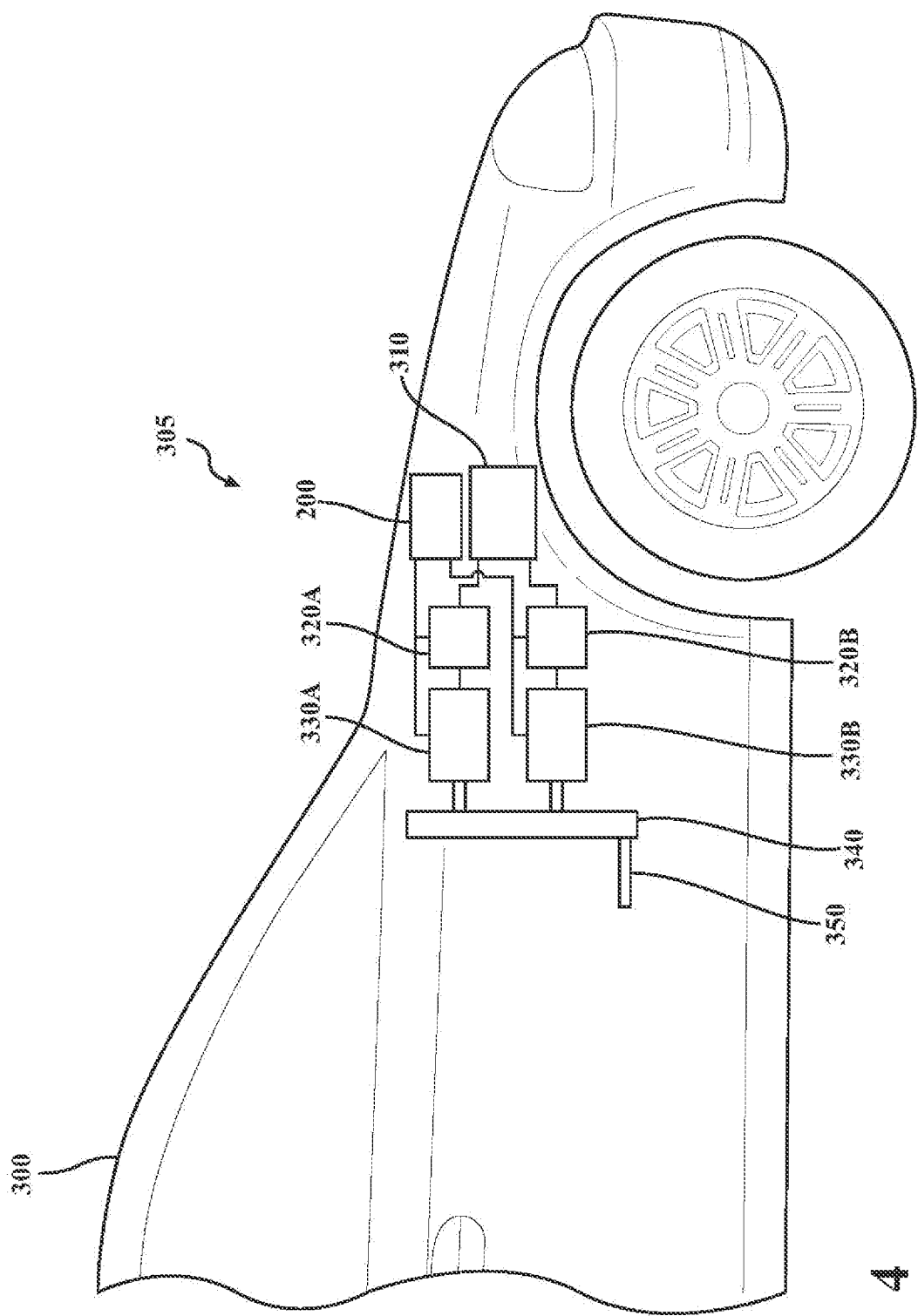
FIG. 4 schematically illustrates an exemplary device including a system including a computerized supervisory controller controlling operation of a plurality of power inverters and corresponding drive units, in accordance with the present disclosure.

FIG. 4 schematically illustrates an exemplary device 300 including a system 305 including a computerized supervisory controller 200 controlling operation of a plurality of power inverters 320A, 320B and corresponding drive units 330A, 330B. The device 300 is illustrated including the system 305 for an inverter bus bar and connector temperature estimation and derating. The device 300 is illustrated as an exemplary vehicle. The device 300 may alternatively include a power generation system, a boat, an airplane, or other similar device utilizing electrical energy to create useful work such as an output torque upon an output shaft. The device 300 is described in relation to the power inverter 10 of FIG. 1 and the computerized supervisory controller 200 of FIG. 3. The device 300 is illustrated including a battery 310. The battery 310 is illustrated in electrical connection with each of the power inverters 320A, 320B. The power inverters 320A, 320B may each be identical or similar to the power inverter 10 of FIG. 1. The power inverters 320A, 320B receive electrical energy in direct current from the battery 310 and transform that energy to electrical energy in alternating current to be provided to the drive units 330A, 330B, respectively. The drive units 330A, 330B may each be described as an electric machine configured for providing an output torque to an output shaft. Each of the drive units 330A, 330B are illustrated including an output shaft connecting the drive units 330A, 330B, respectively, to a transmission unit 340. The transmission unit 340 is configured for receiving torque from each of the drive units 330A, 330B and providing an output torque upon a transmission output shaft 350. The transmission unit 340, in one embodiment, may include one or more planetary gear sets.

The computerized supervisory controller 200 is illustrated in communication with each of the power inverters 320A, 320B, and the drive units 330A, 330B. Each of the power inverters 320A, 320B, and the drive units 330A, 330B include sensors configured to gather data. The sensors of the power inverters 320A, 320B are configured to monitor and provide data related to an inverter coolant temperature. The sensors of the drive units 330A, 330B are configured to monitor and provide data related to a drive unit oil temperature. The device 300 may include a plurality of batteries 310. The device 300 may include one, two, three, or more drive units 330A, 330B and corresponding power inverters 320A, 320B, and the disclosure is not intended to be limited to the examples provided herein.

Figure 5:
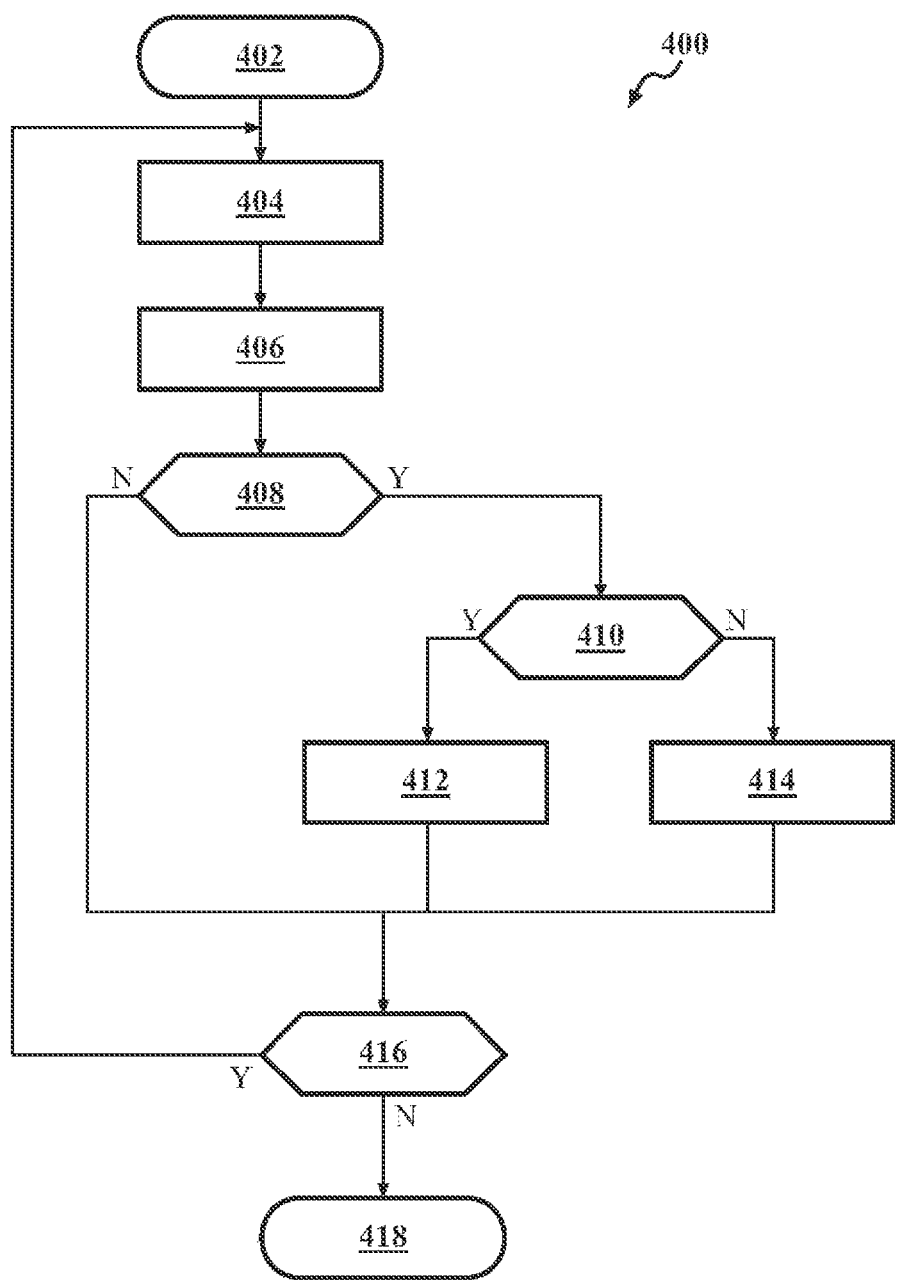
FIG. 5 is a flowchart illustrating an exemplary method for an inverter bus bar and connector temperature estimation and derating, in accordance with the present disclosure.

FIG. 5 is a flowchart illustrating an exemplary method 400 for an inverter bus bar and connector temperature estimation and derating. The method 400 described method steps in relation to the device 300 of FIG. 4 and the power inverter 10 of FIG. 1. The method steps may alternatively apply to similar physical configurations. The method 400 starts at step 402. At step 404, factors related to bus bar temperature and/or DC connector temperature including inverter coolant temperature, drive unit oil temperature, and inverter DC current are monitored. At step 406, a DC bus bar temperature and/or DC connector temperature is estimated and an inverter percent available capability as a function of the estimated temperature(s) is determined for each power inverter 10 in the device 300. At step 408, a determination is made whether the inverter percent available capability in one of the power inverters exceeds a threshold value. If the inverter percent available capability does exceed the threshold value, the method 400 advances to the step 410. If the inverter percent available capability does not exceed the threshold value, the method 400 advances to the step 416.

At step 410, a determination is made whether the inverter percent available capability below the threshold value may be compensated for by balancing load to another one of the plurality or power inverters 10. If the inverter percent available capability below the threshold value may be compensated for by balancing load to another one of the plurality or power inverters 10, the method 400 advances to the step 412, where current directed to each of the power inverters 10 is balanced to avoid DC bus bars 32, 34 and the DC connector 36 of the power inverters 10 from exceeding a desired operating temperature range. If the inverter percent available capability below the threshold value may not be compensated for by balancing load to another one of the plurality or power inverters 10, for example, if there is a single power inverter 10 in the device or if the other power inverter 10 is already at a maximum current condition, the method 400 advances to step 414. At step 414, one or more drive units are derated by imposing a decreased maximum torque output. At step 416, a determination is made whether the device 300 is continuing to operate. If the device 300 is continuing to operate, the method 400 returns to the step 404 to iterate the method subsequent steps. If the device 300 is not continuing to operate, the method 400 advances to the step 418 where the method 400 ends. The method 400 is provided as an exemplary method. Alternative and/or additional method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for estimating temperature within a power inverter and providing control based upon the temperature, the system comprising:
 a battery configured for providing electrical energy in direct current;
 a drive unit including an electric machine configured for utilizing electrical energy in alternating current to provide an output torque to an output shaft;
 the power inverter configured for receiving the electrical energy in direct current, transforming the electrical energy in direct current to the electrical energy in alternating current, and providing the electrical energy in alternating current to the drive unit, wherein the power inverter includes a direct current bus bar; and
 a computerized supervisory controller:
  monitoring an environmental temperature of the power inverter;
  monitoring a current flow of the electrical energy in direct current received by the power inverter;
  determining an estimated temperature of the direct current bus bar based upon the environmental temperature and the current flow;
  determining an inverter percent available capability based upon the estimated temperature;
  comparing the inverter percent available capability to a threshold value, wherein the threshold value is selected based upon maintaining the power inverter within a desired operating temperature range; and
  controlling the drive unit based upon the comparing;
 wherein the direct current bus bar is a first direct current bus bar;
 wherein the power inverter further includes a second direct current bus bar; and
  wherein the computerized supervisory controller determining the estimated temperature of the direct current bus bar includes determining an estimated temperature of the first direct current bus bar and the second direct current bus bar.

2. The system of claim 1, wherein the computerized supervisory controller controlling the drive unit includes derating the drive unit by reducing a maximum requested output torque that the drive unit is permitted to deliver.

3. The system of claim 1, wherein the power inverter further includes a direct current connector connected to the first direct current bus bar and the second direct current bus bar; and
 wherein the computerized supervisory controller determines an estimated temperature of the first direct current bus bar and the second direct current bus bar at a portion of the first direct current bus bar attaching to the direct current connector and at a portion of the second direct current bus bar attaching to the direct current connector.

4. The system of claim 1, wherein the power inverter further includes a direct current connector connected to the direct current bus bar; and
wherein the computerized supervisory controller further determines an estimated temperature of the direct current connector.

5. The system of claim 1, wherein the power inverter is a first power inverter;
wherein the drive unit is a first drive unit;
further comprising:
a second drive unit including a second electric machine; and
a second power inverter; and
wherein the computerized supervisory controller controlling the drive unit includes balancing load between the first power inverter and the second power inverter.

6. The system of claim 1, wherein the power inverter is a first power inverter;
wherein the drive unit is a first drive unit;
further comprising:
a second drive unit including a second electric machine; and
a second power inverter; and
wherein the computerized supervisory controller controlling the drive unit includes:
the computerized supervisory controller determining whether the inverter percent available capability below the threshold value may be compensated for by balancing load between the first power inverter and the second power inverter;
when the inverter percent available capability below the threshold value may be compensated for by balancing load between the first power inverter and the second power inverter, commanding operation of the first drive unit and the second drive unit to balance power between the first power inverter and the second power inverter; and
when the inverter percent available capability below the threshold value may not be compensated for by balancing load between the first power inverter and the second power inverter, derating the first drive unit by reducing a maximum requested output torque that the first drive unit is permitted to deliver.

7. A device including a system for estimating temperature within a power inverter and providing control based upon the temperature, the device comprising:
the system including:
a battery configured for providing electrical energy in direct current;
a drive unit including an electric machine configured for utilizing electrical energy in alternating current to provide an output torque to an output shaft;
the power inverter configured for receiving the electrical energy in direct current, transforming the electrical energy in direct current to the electrical energy in alternating current, and providing the electrical energy in alternating current to the drive unit, wherein the power inverter includes a direct current bus bar; and
a computerized supervisory controller:
monitoring an environmental temperature of the power inverter;
monitoring a current flow of the electrical energy in direct current received by the power inverter;
determining an estimated temperature of the direct current bus bar based upon the environmental temperature and the current flow;
determining an inverter percent available capability based upon the estimated temperature;
comparing the inverter percent available capability to a threshold value, wherein the threshold value is selected based upon maintaining the power inverter within a desired operating temperature range; and
controlling the drive unit based upon the comparing;
wherein the direct current bus bar is a first direct current bus bar;
wherein the power inverter further includes a second direct current bus bar; and
wherein the computerized supervisory controller determining the estimated temperature of the direct current bus bar includes determining an estimated temperature of the first direct current bus bar and the second direct current bus bar.

8. The device of claim 7, wherein the device is a vehicle.

9. The device of claim 7, wherein the computerized supervisory controller controlling the drive unit includes derating the drive unit by reducing a maximum requested output torque that the drive unit is permitted to deliver.

10. The device of claim 7, wherein the power inverter further includes a direct current connector connected to the first direct current bus bar and the second direct current bus bar; and
wherein the computerized supervisory controller determines an estimated temperature of the first direct current bus bar and the second direct current bus bar at a portion of the first direct current bus bar attaching to the direct current connector and at a portion of the second direct current bus bar attaching to the direct current connector.

11. The device of claim 7, wherein the power inverter further includes a direct current connector connected to the direct current bus bar; and
wherein the computerized supervisory controller further determines an estimated temperature of the direct current connector.

12. The device of claim 7, wherein the power inverter is a first power inverter;
wherein the drive unit is a first drive unit;
further comprising:
a second drive unit including a second electric machine; and
a second power inverter; and
wherein the computerized supervisory controller controlling the drive unit includes balancing load between the first power inverter and the second power inverter.

13. The device of claim 7, wherein the power inverter is a first power inverter;
wherein the drive unit is a first drive unit;
further comprising:
a second drive unit including a second electric machine; and
a second power inverter; and
wherein the computerized supervisory controller controlling the drive unit includes:
the computerized supervisory controller determining whether the inverter percent available capability below the threshold value may be compensated for by balancing load between the first power inverter and the second power inverter;
when the inverter percent available capability below the threshold value may be compensated for by balancing load between the first power inverter and the second power inverter, commanding operation of the first drive unit and the second drive unit to balance power between the first power inverter and the second power inverter; and when the inverter percent available capability below the threshold value may not be compensated for by balancing load between the first power inverter and the second power inverter, derating the first drive unit by reducing a maximum requested output torque that the first drive unit is permitted to deliver.

14. A method for estimating temperature within a power inverter and providing control based upon the temperature, the method comprising:

operating a battery configured for providing electrical energy in direct current;

operating a drive unit including an electric machine configured for utilizing electrical energy in alternating current to provide an output torque to an output shaft;

operating the power inverter configured for receiving the electrical energy in direct current, transforming the electrical energy in direct current to the electrical energy in alternating current, and providing the electrical energy in alternating current to the drive unit, wherein the power inverter includes a direct current bus bar; and within a computerized processor:

monitoring an environmental temperature of the power inverter;

monitoring a current flow of the electrical energy in direct current received by the power inverter;

determining an estimated temperature of the direct current bus bar based upon the environmental temperature and the current flow;

determining an inverter percent available capability based upon the estimated temperature;

comparing the inverter percent available capability to a threshold value, wherein the threshold value is selected based upon maintaining the power inverter within a desired operating temperature range; and controlling the drive unit based upon the comparing;

wherein the direct current bus bar is a first direct current bus bar;

wherein the power inverter further includes a second direct current bus bar; and wherein the computerized processor determining the estimated temperature of the direct current bus bar includes determining an estimated temperature of the first direct current bus bar and the second direct current bus bar.

15. The method of claim 14, wherein the power inverter is a first power inverter;

wherein the drive unit is a first drive unit;

further comprising:

operating a second drive unit including a second electric machine; and operating a second power inverter; and wherein controlling the drive unit includes:

determining whether the inverter percent available capability below the threshold value may be compensated for by balancing load between the first power inverter and the second power inverter;

when the inverter percent available capability below the threshold value may be compensated for by balancing load between the first power inverter and the second power inverter, commanding operation of the first drive unit and the second drive unit to balance power between the first power inverter and the second power inverter; and when the inverter percent available capability below the threshold value may not be compensated for by balancing load between the first power inverter and the second power inverter, derating the first drive unit by reducing a maximum requested output torque that the first drive unit is permitted to deliver.

* * * * *